Sept. 21, 1926.
A. L. READ
1,600,426
AUTO STEERING WHEEL ATTACHMENT
Filed Dec. 12, 1923
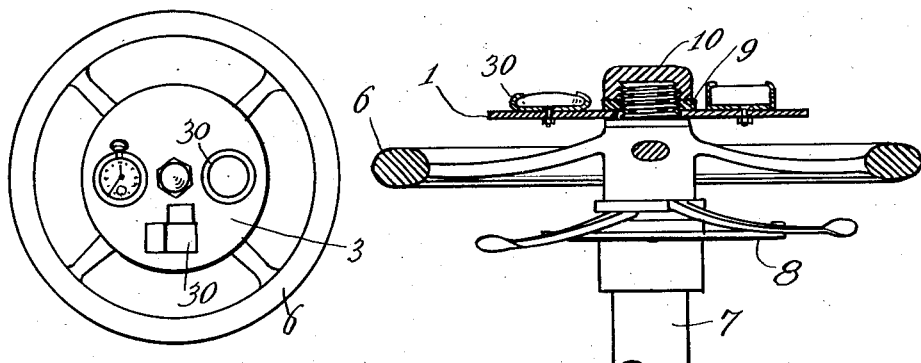
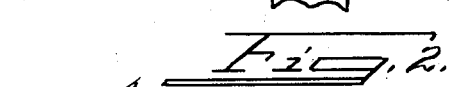
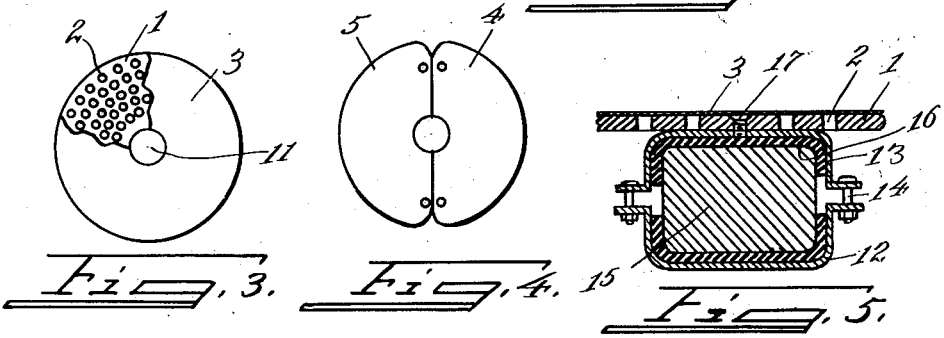
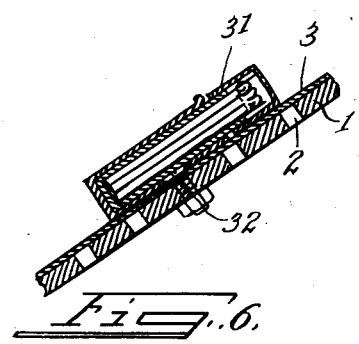
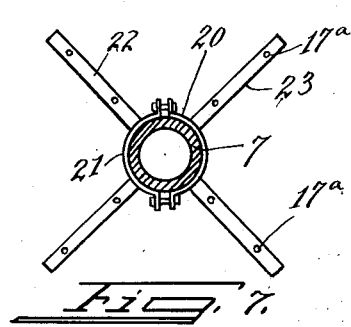
INVENTOR:
Augustus Lee Read
BY
ATTORNEYS.

Patented Sept. 21, 1926.

1,600,426

UNITED STATES PATENT OFFICE.

AUGUSTUS LEE READ, OF CINCINNATI, OHIO.

AUTO STEERING-WHEEL ATTACHMENT.

Application filed December 12, 1923. Serial No. 680,289.

My invention relates to structures to be mounted above the face of automobile steering wheels to provide a mounting for various conveniences such as matches, cigarettes, ash pockets, ladies' powder boxes, and the like, writing pads, mirrors, electric light, etc.

In the provision of a structure to be mounted above the face of the steering wheel of a motor vehicle, the first requisite is that the structure be adapted for different styles of mounting, and for arrangement of accessories in different groupings on the structure. To provide a structure to fit but one steering wheel, and with a definite and non-interchangeable arrangement of accessories, will not result in a commercial proposition, in view of the very wide multiplicity of steering wheel structures, locking steering wheels and the like, and in view of the fact that no two persons will have exactly the same tastes in arranging the several accessories which it is possible to carry within the steering wheel space.

It is the object of my invention to provide a mounting plate, which I term a palette, which can be mounted on a wide variety of steering wheels, and which provides means for mounting in almost any desired relation, a wide range of accessories for convenience of the vehicle driver.

I accomplish my said objects by that certain construction and arrangement of parts to be hereinafter more specifically pointed out and claimed.

In the drawing:

Figure 1 is a top plan view of one arrangement of the palette of my invention.

Figure 2 is a section taken across the showing in Figure 1.

Figure 3 is a plan view of the full circle palette with the covering partially broken away.

Figure 4 is a like view of the half circle styles of palette.

Figure 5 is a detail vertical section showing one mode of mounting the palette devices on spokes of a wheel.

Figure 6 is a detail of the manner in which a match box holder can be arranged on the palette.

Figure 7 is a plan view of a form of spider which may be provided for mounting of the palettes in steering wheels where the spokes are not available or suitable.

It will be understood that I have not attempted to show in the drawings any more than several forms which my invention may take, and that the drawings and description that follow should be taken as explanatory of several forms which illustrate my invention rather than stating the only forms possible which said invention may take.

Referring first to the palette, I have provided a plate 1 of metal, which is foraminated as with the holes 2, and covered with a fabric 3, such as for example, a green billiard cloth.

In instances where the sector for gasoline and spark levers preempts the space where a full circle palette could be mounted, I provide half circle palettes as illustrated in the right and left hand portions 4 and 5 of Figure 4.

I have shown a steering wheel at 6, with steering column housing at 7, and control lever sector at 8. In many styles of steering wheel the hub of the wheel is held down on the steering column by means of devices through which the motor horn is sounded, and I have illustrated a part 9, as indicating the nut which holds the steering wheel down, and part 10, as whatever horn sounder that may be used. Since the point of the arrangement is that the nut 9 shall hold the palette 1 down fast with the steering wheel, it is not believed to be necessary to show in detail any form of horn sounder.

In order to provide that the palette may lie fairly close to the steering wheel spokes, it will be my practice to leave a central hole 11 therein, which hole will be large enough to clear the usual steering wheel hub devices.

Thus one form of my invention is to place the palette on the hub of the steering wheel and secure it down on the hub with some form of wheel mounting element. This will provide an adaptation of my invention to a wide variety of motor vehicle steering wheels.

In cases where the spokes of the steering wheel are so arranged with relation to the hub that the palette can be set down around the hub with the body of the palette resting fairly close to the spokes, I can mount the palette on the spokes of the wheel with clamps.

In Figure 5 has been shown a clamp consisting of a lower member 12, and an upper member 13, with bolts 14 for securing the two parts in clamping relation about the spoke 15. I prefer to insert rubber gasket, or any packing material 16 between the clamp portions and the spoke. The top member of the clamp has a tapped hole thereon to engage a mounting screw 17. In order to set up the palette the position for the several clamps to be employed is determined, and the cloth top of the palette is then punched through by a nail or other pointed object, whereupon the screws can be set through the holes in the palette and screwed into the clamps.

Should there be no chance of mounting the palette by means of spokes, or by means of the wheel retaining devices, I provide a spider which will be clamped around the steering column either above or below the steering wheel. This clamp has a two column or wheel hub engaging portions 20 and 21, and the arms 22 and 23 radiate from the two clamp portions. By mounting the clamp portions at a convenient point, a spoke device is provided onto which the palette can be arranged. The spokes will be perforated with tapped holes 17$^a$, into which screws, as indicated in the instance of screws 17 can be set to hold the palette onto the arms. Should the mounting point be below the steering wheel, then it will be necessary to use the sectional form of Figure 4.

This sectional form can also be used where the control lever sector is mounted above the steering wheel, it being required in such a case to use the half palette, and to tap several holes into the sector plate, unless some convenient screw hole can be found in the plate, as provided with the vehicle, this last being usually the case. In either event, however, screws can be thrust through the palette, and engaged into the holes in the sector plate, thereby holding the half circle palette in place.

In mounting any devices on the palette, they need be provided merely with a bolt hole or holes. I have illustrated in Figure 1 a series of devices 30 mounted around the palette. In Figure 6, I have illustrated in larger scale a match box holder 31 of the usual type, through which passes a small bolt 32, the palette top cloth being punched away, and one of the holes through the metal plate serving to permit the bolt shank to pass through the palette.

It should be observed that in all styles there is quite a liberal space between the rim of the steering wheel and the hub, in which the palette can be set, without interfering with the manipulation of the wheel, and in my preferred forms the palette is made of a size which will not interfere with the hub of any standard style of steering wheel.

It should also be noted that by providing a standard form of palette, and providing the dealer with the several forms of mounting device, it will be a simple problem to work out the best mode of mounting the palette on any style of steering wheel. Should a manufacturer desire to equip his vehicles with the device, it will then be practical to make up a special form, adapted for use with the particular wheel in question.

Having thus described my invention, what I claim as new and desire to secure by Letters Patent, is:—

1. A device for use adjacent the steering wheel of a motor vehicle comprising a plate element having interspaced holes therein through which shanks of mounting device for accessories can pass, and means for mounting the said plate element adjacent a steering wheel, said plate being covered with a fabric on the top to conceal the said holes.

2. A device for use adjacent the steering wheel of a motor vehicle comprising a plate element having a clearance at the axis thereof for a steering wheel hub or column, said plate foraminated and covered with a cloth top facing, and means for mounting the plate adjacent the steering wheel with its axis at the axis of said wheel.

AUGUSTUS LEE READ.